F. D. HARPER.
MANUFACTURE OF DRY BATTERIES FOR FLASH LIGHTS AND OTHER PURPOSES.
APPLICATION FILED FEB. 19, 1914.
1,157,531. Patented Oct. 19, 1915.
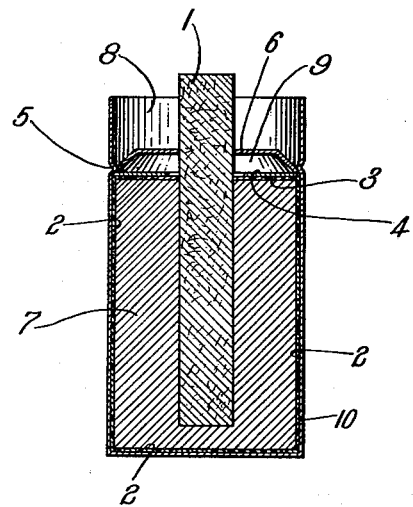
Witnesses:
Samuel Witkin
Israel Ruby
Inventor.
Frederick D. Harper
per C. S. Ward Atty

UNITED STATES PATENT OFFICE.

FREDERICK D. HARPER, OF EVERETT, MASSACHUSETTS.

MANUFACTURE OF DRY BATTERIES FOR FLASH-LIGHTS AND OTHER PURPOSES.

1,157,531.

Specification of Letters Patent.

Patented Oct. 19, 1915.

Application filed February 19, 1914. Serial No. 819,838.

*To all whom it may concern:*

Be it known that I, FREDERICK D. HARPER, having my usual place of business at No. 71 Lewis street, Everett, in the county of Middlesex and State of Massachusetts, have invented certain new and useful Improvements in the Manufacture of Dry Batteries for Flash-Lights and other Purposes, of which the following is a specification.

This invention relates to improvements in dry batteries such as are used on bell circuits for ignition purposes, flash lights, and for many other purposes.

The principal objects of the invention are to produce a batte / of greater efficiency than those now upon the market and also to provide means whereby a large number of batteries may be constructed and placed in stock for future delivery without deterioration during such time, means being provided whereby the batteries may be easily rendered active when desired.

Dry batteries as usually constructed comprise a zinc cell or container which is lined with absorbent paper, a depolarizing mass, usually composed of manganese and carbon or graphite, containing centrally a carbon rod or pole being placed within the lined can and the depolarizing material being tamped firmly therein. The mass thus introduced into the container is in a moist condition so that when the battery is completed it is in condition for immediate use, and is adapted to give its fullest efficiency. If however, the battery is permitted to lie unused for a time it dries out and is incapable of yielding its full efficiency. Certain chemical actions also take place which deteriorate the battery. For these reasons it has been undesirable heretofore for the manufacturer to make and store these assembled dry batteries in anticipation of future orders.

The present invention contemplates the making of the battery in such a manner that the parts may be stored, either separately or in assembled condition without likelihood of deterioration and may be quickly and easily rendered active when desired.

In the usual form of dry batteries the depolarizing mass is covered by a layer of cement or other inert material which does not contribute to the efficiency of the battery. Another feature of the present invention resides in providing the top of the container or cell with a zinc plate or washer which has the same active relation as the sides of the cell, the battery being so constructed that when the exciting fluid is introduced the pressure due to the expansion of the absorbent material and of the depolarizing mass itself will cause substantially the same pressure against the zinc washer as that which is exerted against the side of the cell.

Other objects of the invention and the nature thereof will more fully appear from the following description, the accompanying drawings and will be pointed out in the annexed claims.

The drawing is a vertical longitudinal sectional view of a dry battery embodying a preferred form of my invention.

The container 10 of zinc or other suitable material is provided with a lining consisting of one or more thicknesses 2 of absorbent paper said lining covering the bottom and extending along the sides to a height slightly greater than the depth to which the container is to be filled with the depolarizing material. The depolarizing material 7 is molded separately with a carbon rod 1 embedded centrally therein, the depolarizing material being subjected to heavy pressure in the mold. The molded depolarizing material may then be stored separately from the containers or it may be placed therein without fear of deterioration if protected in the manner hereinafter described. The molded mass is desirably of such size as to fit very snugly the lined container. The top of the container is then covered by one or more layers 3 of absorbent material preferably the same as that lining the container and a washer 4 of zinc or of the same material of which the container is constructed is placed upon the absorbent material and securely fastened therein so that its periphery intimately contacts with the metallic wall of the container. This washer is provided with a central aperture for the carbon pole of a sufficient size to prevent short circuiting of the cell. In order to cause such intimate relation between the periphery of the zinc washer and the wall of the can a bead 5 is preferably impressed into the periphery of the container so that the inwardly bent portion thereof will overlie and contact firmly with the washer, thus forcing the washer 4 tightly against the absorbent covering 3. By this construction the expansion which occurs when the exciting fluid is introduced into the battery causes a pressure against the zinc covering washer substantially equal to the pressure against the sides of the cell, and the washer being of the same material as that of the cell in effect constitutes an additional area of the cell wall which increases the efficiency and strength of the battery.

It is desirable to have a space above the zinc washer for the reception of the exciting fluid when the batteries are to be rendered active which will contain a sufficient amount of exciting material to thoroughly saturate the absorbent lining of the container as well as permeate the depolarizing mass and in the present invention I have provided a cover 6 of inverted concaved form which may be made of paper or other suitable material and may be held in place by the bead 5 in the can to provide a chamber 9 of the character aforesaid. The battery constructed in this manner without the application of the exciting fluid may be stored for an indefinite period without danger of deterioration. When the battery is to be used it is taken from storage and charged with the exciting fluid an excess amount being poured into the chamber aforesaid. When a sufficient amount has been absorbed the excess is drained off and the remaining portion 8 of the cell filled with the usual sealing material such as paraffin, sealing wax or other impervious material, a vent hole leading from the chamber 9 being preferably provided through the sealing material. The chamber 9 not only provides means for holding an excess of exciting fluid when the battery is being placed in commission but also serves as a chamber to receive such gases as are developed by the chemical action within the cell.

It will be understood that the battery may be made in any form and that other means may be used for retaining the metallic washer or cover in place within the spirit and scope of the invention.

Having thus described my invention what I claim as new and desire to secure by Letters Patent is:

1. A dry battery comprising a zinc container, a lining therefor of absorbent material, a carbon electrode mounted in a core of depolarizing material snugly fitting within said container, an absorbent paper washer covering the top of said core, a zinc washer provided with an opening leaving a space surrounding the carbon electrode located on the top of said paper and contacting with the walls of the container, means for positively securing the said zinc washer in place, and a covering of sealing material therefor.

2. A dry battery comprising a zinc container, a lining therefor of absorbent material, a carbon electrode mounted in a previously prepared core of depolarizing material snugly fitting within said container, an absorbent paper washer covering the top of said core, a zinc washer on the top of said paper washer, the zinc washer having an opening through which the carbon electrode projects and of sufficient diameter to prevent short circuit, said zinc washer contacting with the walls of the container, the walls of the container extending above the top of the core and provided with a bead for retaining in position said washers substantially as described.

In testimony whereof I have affixed my signature, in presence of two witnesses.

FREDERICK D. HARPER.

Witnesses:
SAMUEL WITKIN,
ISRAEL RUBY.